(12) United States Patent
Yee

(10) Patent No.: US 10,470,512 B1
(45) Date of Patent: Nov. 12, 2019

(54) BALACLAVA HEADGEAR FOR HEAD-MOUNTED DISPLAY

(71) Applicant: Facebook Technologies, LLC, Menlo Park, CA (US)

(72) Inventor: Phillip Yee, San Francisco, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 46 days.

(21) Appl. No.: 15/600,687

(22) Filed: May 19, 2017

(51) Int. Cl.
*A42B 1/04* (2006.01)
*G02B 7/00* (2006.01)
*G02B 27/01* (2006.01)

(52) U.S. Cl.
CPC ............... *A42B 1/04* (2013.01); *A42B 1/041* (2013.01); *A42B 1/046* (2013.01); *G02B 7/002* (2013.01); *G02B 27/017* (2013.01)

(58) Field of Classification Search
CPC ........... A42B 1/04; A42B 1/041; A42B 1/046; A42B 1/24; A42B 1/245; A42B 1/247; A42B 1/008; G02B 27/017; G02B 7/22; G02B 7/20; G02B 7/022; G02B 27/0176; G02B 27/01; G02B 2027/0169; G02B 2027/0192; G02B 2027/014; A41D 1/002; G03B 17/56; G03B 17/568; G03B 17/08; G01R 13/202
See application file for complete search history.

(56) References Cited

U.S. PATENT DOCUMENTS

| | | | | |
|---|---|---|---|---|
| 1,504,029 A * | 8/1924 | De Rosier | ............... | A42B 1/046 2/8.2 |
| 2,020,008 A * | 11/1935 | Yorgensen | ............. | A42B 1/046 2/206 |
| 2,642,574 A * | 6/1953 | Eloranta | ................ | A42B 1/046 128/201.28 |
| 3,990,112 A * | 11/1976 | Ciffolillo | ............... | A41D 13/11 2/424 |
| 4,121,303 A * | 10/1978 | Reece | .................. | G01R 13/202 2/10 |
| 5,456,277 A * | 10/1995 | Pontius, Jr. | ............ | G03B 17/08 135/90 |
| 2003/0115661 A1* | 6/2003 | Dobbie | .................. | A42B 1/046 2/422 |
| 2008/0250538 A1* | 10/2008 | Saladino | ................ | A42B 1/247 2/10 |
| 2009/0303588 A1* | 12/2009 | Charlesworth | ........ | A42B 1/247 359/481 |
| 2012/0033142 A1* | 2/2012 | Thomson | ............... | G02B 7/002 348/838 |
| 2015/0103152 A1* | 4/2015 | Qin | ........................ | G02B 13/08 348/53 |
| 2016/0260261 A1* | 9/2016 | Hsu | ....................... | G06T 19/006 |
| 2016/0338439 A1* | 11/2016 | Walden | .............. | G02B 27/0176 |
| 2017/0079359 A1* | 3/2017 | Chase | .................... | A42B 1/066 |
| 2017/0216099 A1* | 8/2017 | Saladino | ................ | A61F 9/029 |
| 2018/0017796 A1* | 1/2018 | Toso | .................. | G02B 27/0172 |

* cited by examiner

*Primary Examiner* — Amy Vanatta
(74) *Attorney, Agent, or Firm* — Fenwick & West LLP

(57) ABSTRACT

A head-mounted display (HMD) includes a fabric hood shaped and dimensioned to be worn over a user's head. The HMD also includes a rigid body housing a display panel at one side and open at an opposite side to receive with the user's face. A fixture is configured to secure the fabric hood to the rigid body.

9 Claims, 5 Drawing Sheets

BALACLAVA HEADGEAR FOR HEAD-MOUNTED DISPLAY

BACKGROUND

The present disclosure generally relates to a head-mounted display (HMD), and specifically to an HMD with balaclava for securing to a user's head.

Virtual reality (VR), augmented reality (AR), or mixed reality (MR) provide a simulated environment created by computer technology and presented to a user, such as through an HMD. The HMD may include an enclosure that has an electronic display panel that presents visual data to a user wearing the HMD. In some cases the HMD may be attached to the user's head using various adjustable straps. However, as the contact area between the user's head and the straps is limited, the strap assembly may cause discomfort for the user and be non-ergonomic. Furthermore, due to the limited contact area, the HMD may shift in position from movement of the user's head. This shifting is undesirable as the user's experience with the HMD is typically optimal at specifically calibrated positions. For example, if the HMD provides a stereo display, movement of the HMD can cause the image received by the user's eyes to distort. Thus, the straps may require frequent adjustment by the user, distracting the user from the experience provided by the HMD. Furthermore, the straps do not prevent excess light from entering the HMD, which may also affect the experience provided by the HMD. Thus, an improved method of securing the HMD to a user's head is desired.

SUMMARY

Embodiments relate to a balaclava headgear for a head-mounted display (HMD). The HMD includes a fabric hood shaped and dimensioned to be worn over a user's head. The HMD also includes a rigid body housing a display panel at one side and open at an opposite side to receive with the user's face. A fixture is configured to secure the fabric hood to the rigid body.

In one embodiment, the fabric hood is collapsible and is elastic. The fabric hood may also reduce the passage of light into the enclosure of the rigid body. In some embodiments, speakers may be attached to the fabric hood at the position of the user's ears.

BRIEF DESCRIPTION OF THE FIGURES

Figure (FIG. 1 is a perspective view of an HMD with a balaclava headgear, according to an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments include a fabric hood which may be made of elastic material that is attached to a head mounted display (HMD). The HMD is worn by placing the fabric hood over a user's head. The fabric hood may reduce the incursion of ambient light into the HMD cavity while also providing a more secure placement of the HMD on a user's head without the need of adjusting straps.

Figure 1:
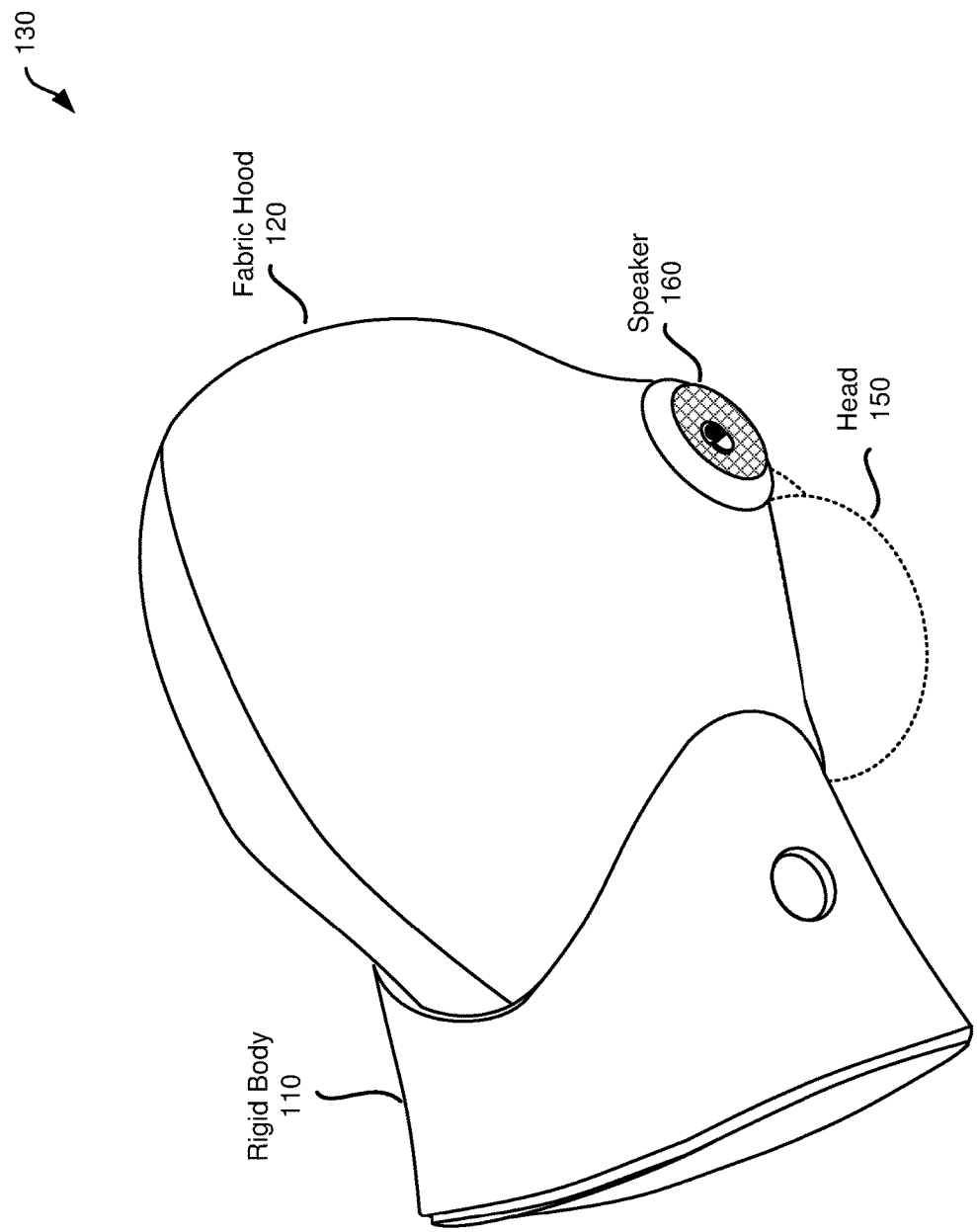

FIG. 1 illustrates a perspective view of an HMD 130, according to an embodiment. As shown, the HMD 130 may include a fabric hood 120, and a rigid body 110, as well as speaker(s) 160. While a particular configuration of elements is shown in FIG. 1, in other embodiments the elements may be configured differently. For example, the balaclava headgear may not include the speaker(s) 160. Additionally, in the figures of the application, the user's head 150 is indicated by dotted lines.

The fabric hood 120 is shaped and dimensioned to be worn over the head 150 of a user. The fabric hood 120 may be deformable to accommodate user's heads of different dimensions and sizes. The fabric hood 120 is coupled to the rear face of the rigid body 110 and is shaped accordingly such that when the fabric hood 120 is worn over the user's head 150, the fabric hood 120 may secure the rigid body 110 to the user's head. The rear face of the rigid body 110 interfaces with the user's head 150, as shown in FIG. 1.

The fabric hood 120 may be made of an elastic material or combination of elastic materials. The material may be created from man-made or natural fibers, such as cotton, rayon, nylon, polyester, elastane, and so on. The material has an elastic strength sufficient to support the mass of the rigid body 110 when the fabric hood is placed on the head 150. When placed on the user's head 150, the fabric hood 120 distributes the mass of the rigid body 110 over a large contact area between the fabric hood 120 and the user's head 150, and hence enables the rigid body 110 to be comfortably supported by the user's head 150. The fabric hood 120 may have a thickness sufficient to ensure durability or a usable lifecycle for the fabric hood 120 for a set number of wear cycles, while being thin enough to ensure airflow through the material to allow for thermal energy to transfer via convection from the user's head 150 to the environment to keep the user comfortable.

In one embodiment, the fabric hood 120 includes an elastic band (not shown) that is attached along the lower boundary of the fabric hood 120, i.e., where it terminates along the lower portion of the user's head 150. This elastic band provides further support to secure the fabric hood 120 to the user's head 150 while it is being worn. In one embodiment, the lower boundary of the fabric hood 120 includes an opening in which the elastic band protrudes and acts like a drawstring. The elastic band may, in such a case, be separated upon exiting the opening, and furthermore, a cordlock or other locking mechanisms may be attached to either end of the elastic band drawstring to allow the elastic band drawstring to be used to decrease the diameter of the lower boundary of the fabric hood 120 to tighten it against a user's head 150 when worn.

In one embodiment, instead of an elastic band, the material of the fabric hood 120 is folded in upon itself at the same lower boundary in order to provide the additional support.

The fabric hood 120 may be attached to the rigid body 110 via any type of fixture. This may include an adhesive or a physical coupling, such as staple(s) or stitching. Alternatively, if the fabric hood 120 is made of heat-sensitive materials (e.g., synthetic polymers), the fixture between the fabric hood 120 and rigid body 110 may be achieved via heat welding the fabric hood to the rigid body 110. In another embodiment, the fixture between the fabric hood 120 and the rigid body 110 is not permanent and is detachable, such that the fabric hood 120 can be removably from the rigid body 110 for washing or replacement. This may be achieved, for example, by using a zipper assembly or a velcro coupling for the fixture. The fixture should exert an attachment force that is strong enough such that the fabric hood 120 does not become detached from the rigid body 110 during normal movements of the user's head in the course of using the HMD The fabric hood 120 may be constructed using more than one material and/or more than one section of material. For example, the fabric hood 120 may be constructed using two halves of the same material joined along a centerline spanning longitudinally along the fabric hood 120 (i.e., from the front to the back). These halves may be attached to each other using adhesive, a physical coupling (e.g., stitching), heat welding, or other methods.

In one embodiment, the fabric hood 120 is reinforced in certain areas in order to provide additional structural support. This reinforcement may take the form of attaching to the fabric hood 120 an additional layer of the same material used to make the fabric hood 120. The reinforcement may be applied along seams in the fabric hood 120 or where the fabric hood 120 couples with the rigid body 110. For example, additional reinforcement may be provided along the two halves of the fabric hood described above.

The fabric hood 120 may come in different sizes for larger differences in head sizes. For example, the fabric hood 120 may be made available in different sizes and dimensions to fit the heads of younger users versus older users. In one embodiment, the fabric hood 120 includes a manual adjustment mechanism that allows for larger adjustments of the size of the fabric hood 120 beyond the adjustment achievable via the elasticity of the fabric hood. The manual adjustment mechanism may include a manually adjustable elastic band that may be tightened by the user and which may be located along the lower boundary of the fabric hood 120 (as described above).

One of many advantages of using the fabric hood 120 over a traditional strap attachment is that the fabric hood 120 is able to more completely block out ambient light from entering the enclosure of the rigid body 110 (e.g., via the gaps between the rigid body 110 and the user's face), thus improving the experience of the user using the HMD 130. To further block any incoming light (e.g., up to a certain percentage), the fabric hood 120 may be made of a dark color (e.g., black) or light blocking material (e.g., blackout fabrics) to block the highest amount of light for the material used. Furthermore, additional material with light blocking or reducing properties may be added at the boundary between the rigid body and the fabric hood 120 as well as at the boundary between the fabric hood 120 and the user's head 150 to further reduce the amount of incoming ambient light into the rigid body 110 while not increasing weight beyond a certain percentage or reducing the thermal pass-through proprieties of the fabric hood 120 beyond a certain percentage.

The rigid body 110 houses one or more electronic display panels to present images to the user and is attached to the fabric hood 120. The rigid body 110 is made of a rigid material, which may be relatively lightweight to reduce strain on the user while it is worn, but stable enough to support the internal components and repeated wear cycles. In some embodiments, the rigid body 110 may include, in addition to the electronic displays, an imaging sensor, accelerometer, gyroscope, barometer, microphone, magnetometer, one or more switches, a touch interface, and other components that may be used in a VR/AR/MR headset. The rigid body 110 is hollow, allowing the user to view the electronic display housed within the rigid body 110. The rigid body 110 may further include a facial interface (not shown) placed between the rigid body 110 and the user's head, and which is attached to the rigid body 110. This facial interface is made from supportive material, such as foam.

The speaker(s) 160 are attached to the fabric hood 120 and provide audio to the user. In one embodiment, the speaker(s) 160 are attached to the fabric hood 120 at a position such that when the fabric hood 120 is worn on the head 150, the speaker(s) 160 are adjacent to the user's ears or cover or overlap with the user's ears. Due to the elastic nature of the fabric hood 120, the speakers 160 are stretched to a position overlapping with a user's ears regardless of the size of the user's head. The fabric hood 120 may have one or two speakers 160.

Each speaker 160 may be coupled wirelessly or in a wired fashion to the rigid body 110. In the case of a wireless coupling, the speaker 160 may include a power source, such as rechargeable battery (which may be charged by cable or inductively). In the case of a wired coupling, a wire may be passed from the rigid body 110 to the speaker 160 along the seams or other hidden path along the fabric hood 120. The hidden path is a path along the interior surface of the fabric hood 120 that is not normally noticeable to a wearer. For example, the wire may be passed within the lower boundary of the fabric hood 120 where the elastic band described above may be place.

Each speaker 160 may produce audio that is associated with the images displayed by the electronic display in the rigid body 110. The direction of the audio of each speaker 160 is towards the user's ear(s). The speaker 160 may be any type of speaker, and may be of a dimension and mass that does not cause discomfort to the user when the fabric hood 120 is worn (i.e., is below a specified weight, thickness, and size).

In addition to a speaker 160, the fabric hood 120 may also include a microphone (not shown). This microphone may be integrated into the speaker(s) 160, and may be used to record ambient sounds or to record the user's voice.

The balaclava headgear for use in HMDs described here provides many exemplary advantages. As the fabric hood 120 covers the entire user's head, and especially covers the gaps between the rigid body 110 and the user's head, this prevents or reduces the incursion of ambient light into the enclosure of the rigid body 110, improving the user experience with the HMD. The balaclava headgear described here also provides a more secure and stable placement of the rigid body 110 on the user's head 150. In contrast to a strap mechanism, the contact area of the fabric hood 120 with the user's head is greatly increased, increasing the stability of the attached rigid body 110. The balaclava headgear described here is also easier to place on the head. In contrast to a strap mechanism, which would require various adjustments of each individual strap, the elastic nature of the fabric hood 120 allows it to conform automatically to the user's head 150 without significant adjustment. As the fabric hood 120 is made entirely out of fabric, compared to a strap system with rigid clasps and other hard materials, the balaclava headgear may also be more comfortable to wear for a longer period of time. In contrast to a complicated strap mechanism, the fabric hood 120 may also be easier to manufacture, being composed of single sheets of fabric rather than various straps and connectors that need to be assembled and built.

Figure 2:
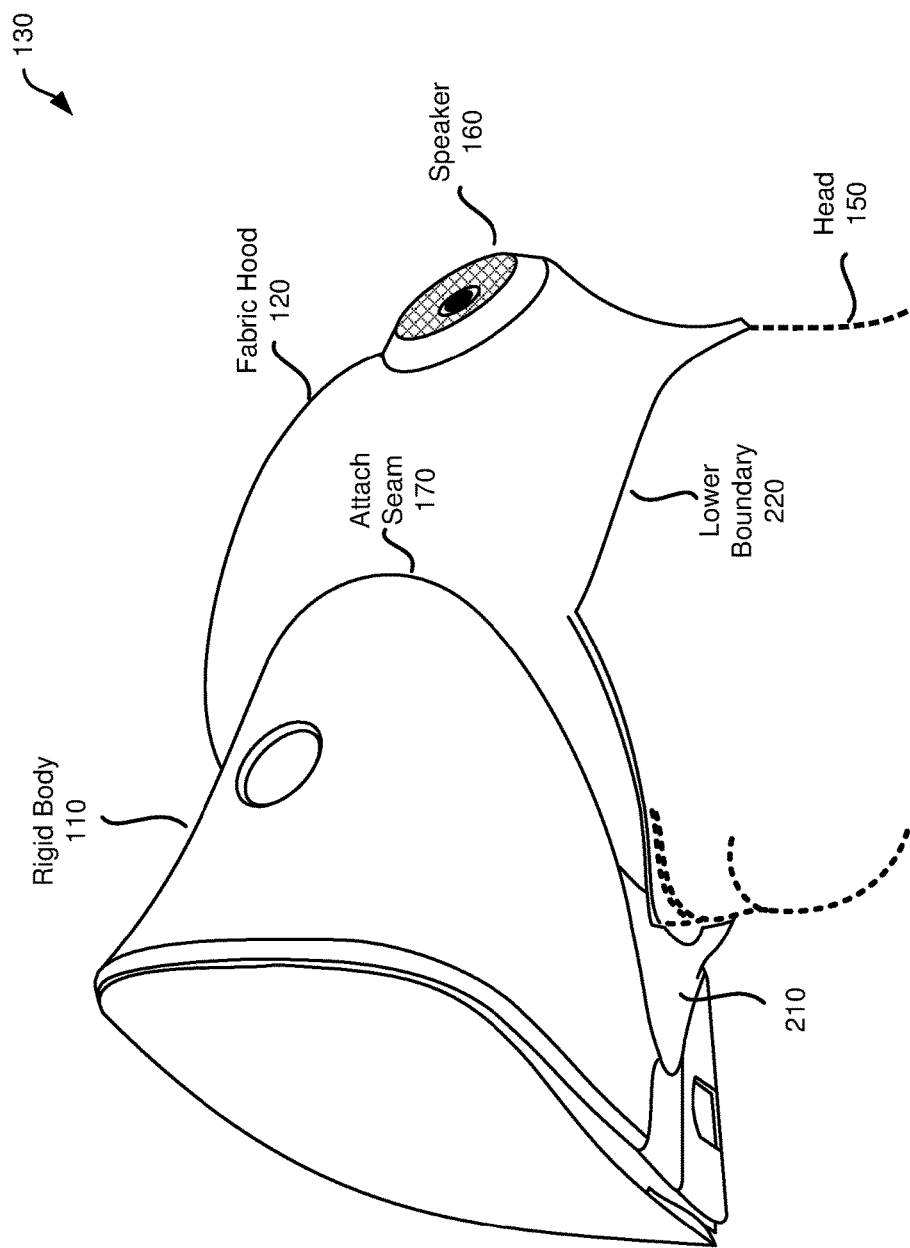
FIG. 2 is another perspective view of the HMD of FIG. 1, according to an embodiment.

FIG. 2 is another perspective view 230 of the HMD 130 of FIG. 1, according to an embodiment. As seen from FIG.

2, the fabric hood 120 may extend around and be coupled to the bottom of the rigid body 110 along the attach seam 170. This may provide additional light blocking capabilities, as well as structural integrity to the fabric hood. In particular, the area 210 of the rigid body 110 that is near the nose of the user has an opening designed to provide a space for the nose. The opening in the area 210 is to accommodate the user's nose, e.g., to allow improved breathability and spatial accommodation of the user's nose. However, this opening may allow significant intrusion of light. Instead, the fabric hood 120 can be extended to cover this area. As the fabric hood 120 is permeable to air, covering this area with the fabric hood material does not impede upon breathability for the user as significantly as compared to a rigid covering. Furthermore, as some users may have larger sized noses, the deformability of the fabric hood material allows it to wrap around the nose if needed, without impacting the fitment of the rigid body 110.

As shown in FIG. 2, the fabric hood 120 can extend down below the level of the user's ears to a level below the user's nose but above the user's mouth along the lower edge 220. This allows unobstructed movement for the user's mouth. Furthermore, the lower edge 220 of the fabric hood 120 extends around the user's head at this level (i.e., below the user's nose and above the user's mouth). As described above, in some embodiments, the fabric hood 120 includes an elastic band. This elastic band can be integrated into or attached onto the fabric hood along this lower edge 220. Furthermore, as described above with reference to FIG. 1, in some embodiments, the speaker(s) 160 are wired. If the speakers(s) 160 are wired, the wire for the speaker(s) 160 may also be included (and hidden) along the lower edge 220.

Figure 3:
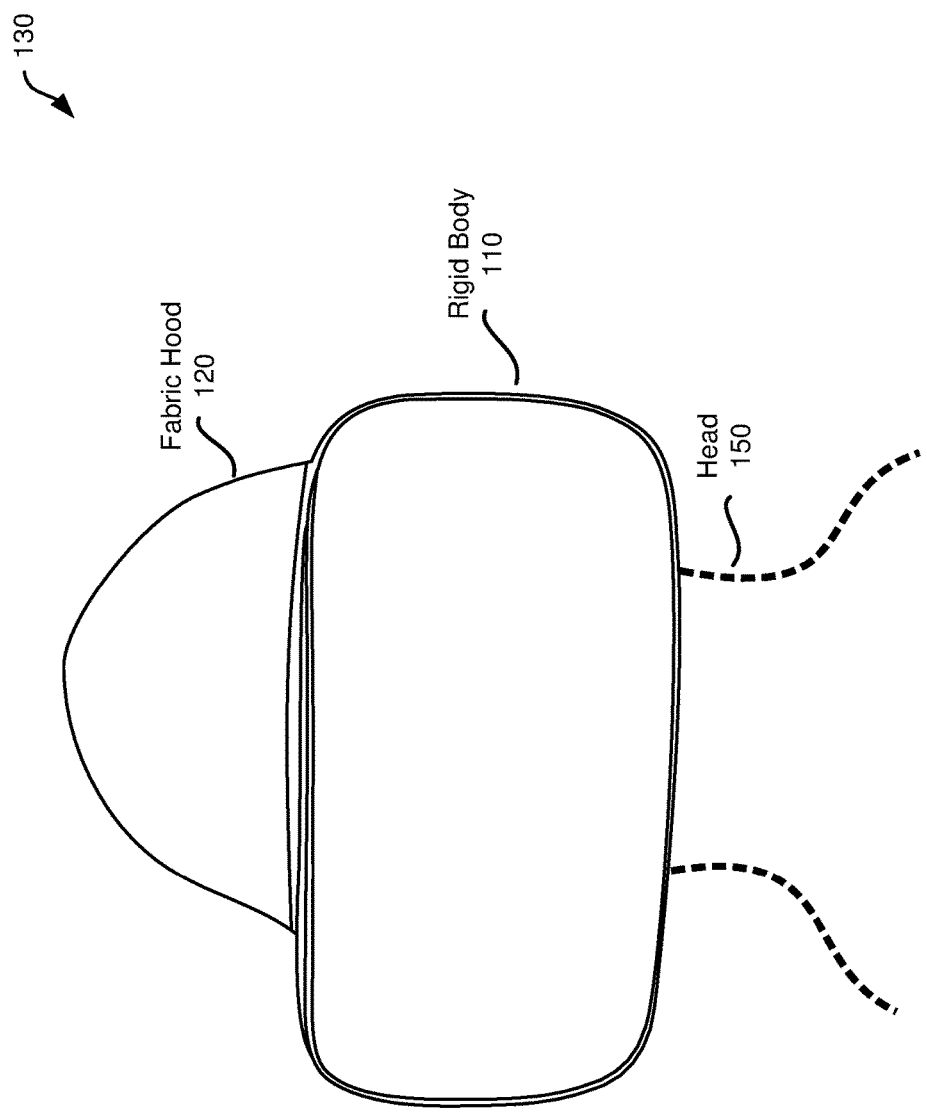
FIG. 3 is a front view of the HMD of FIG. 1, according to an embodiment.

FIG. 3 is a front view of the HMD 130 of FIG. 1, according to an embodiment. In the front view, the fabric hood 120 can be seen on the top of the user's head 150, with the rigid body 110 in front of the user's head 150. Note how the entire top of the user's head is covered with the fabric hood and the rigid body 110. Typically, ambient light (e.g., from the sun, from ceiling lighting) is most significant from above the user. By covering the entire top of the user's head, the fabric hood 120 and rigid body 110 reduce the amount of incoming light into the rigid body 110.

Figure 4:
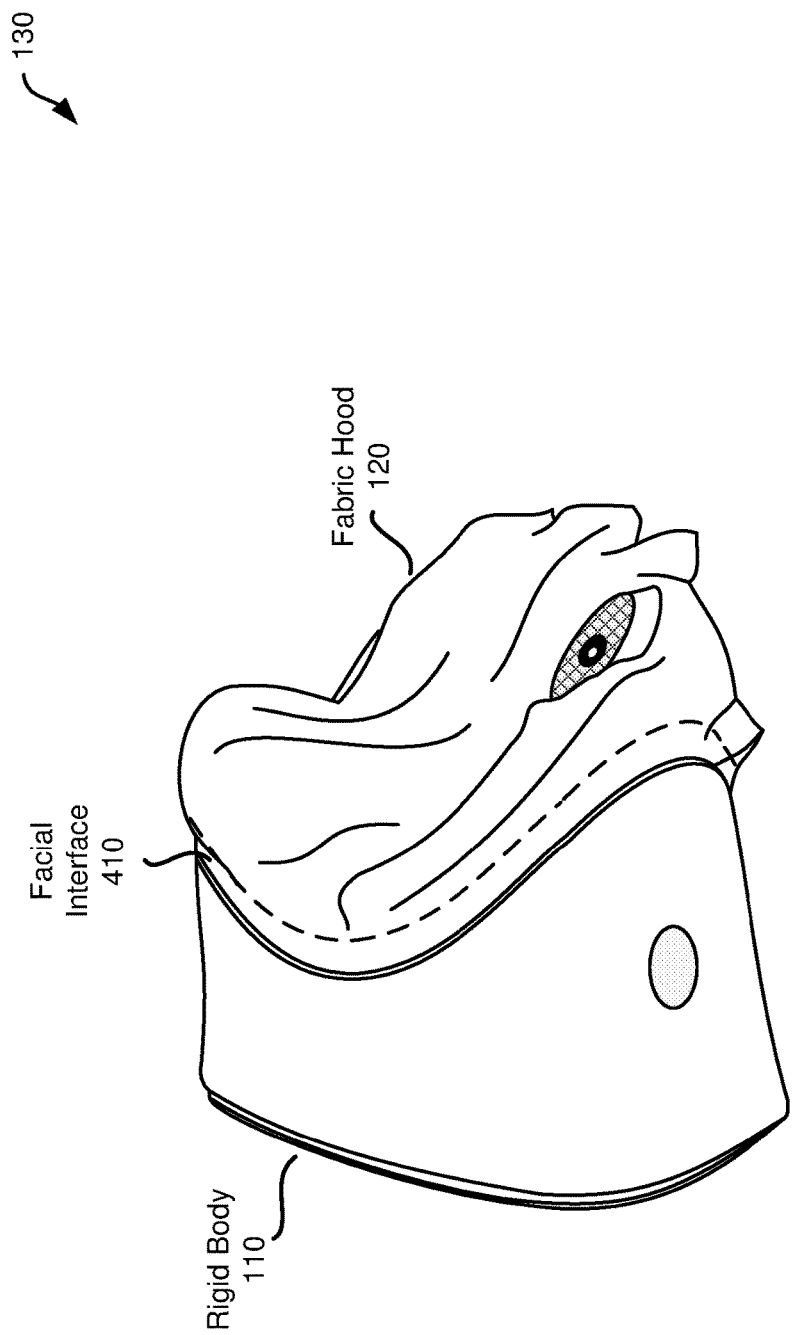
FIG. 4 is a perspective view of a HMD of FIG. 1 with the balaclava headgear collapsed, according to an embodiment.

FIG. 4 is a collapsed view of the HMD 130 of FIG. 1, according to an embodiment. As shown in the figure, the fabric hood 120, as illustrated, is collapsed and is not placed on a user's head. Because the fabric hood 120 is made from deformable fabrics or other deformable materials, it does not necessarily retain the shape of the user's head when not worn on the user's head. Instead, it can be collapsed into a more compact shape relative to when it is being worn on the user's head. This allows for more compact storage and easy transport of the fabric hood 120.

As shown in FIG. 4, the fabric hood 120 encloses a facial interface 410 that is coupled to the rigid body 110. The facial interface 410 extends around the border of the rigid body 110 along the open face of the rigid body 110 (i.e., the face that is received by the user's head). Unlike the fabric hood 120, the facial interface 410 does not collapse, as it is made of a relatively less deformable material (e.g., foam). Thus, the outline of the facial interface 410 the fabric hood 120 is visible through the collapsed fabric hood 120, as shown in FIG. 4.

Although the fabric hood 120 is described here as being deformable and collapsible in FIG. 4, this may not be the case in other embodiments. The fabric hood 120 may be made out of a semi-rigid or rigid structure. The fabric hood 120 may only be collapsible when external force (in addition to gravity) is applied. The fabric hood 120 may have particular edge lines at which it is designed to be folded or deformed to create a more compact structure when folded.

In one embodiment, the fabric hood 120 may include an attachment or fixture mechanism along the lower edge of the fabric hood 120 which may be removably secured to a second fixture point at the front or other area of the rigid body 110, or the top of the fabric hood 120, such that the fabric hood 120 may be wrapped around the rigid body 110 and attached to this second fixture point. This prevents the fabric hood 120 from moving around in the collapsed state, and also provides inherent protection of the enclosure of the rigid body 110.

Figure 5:
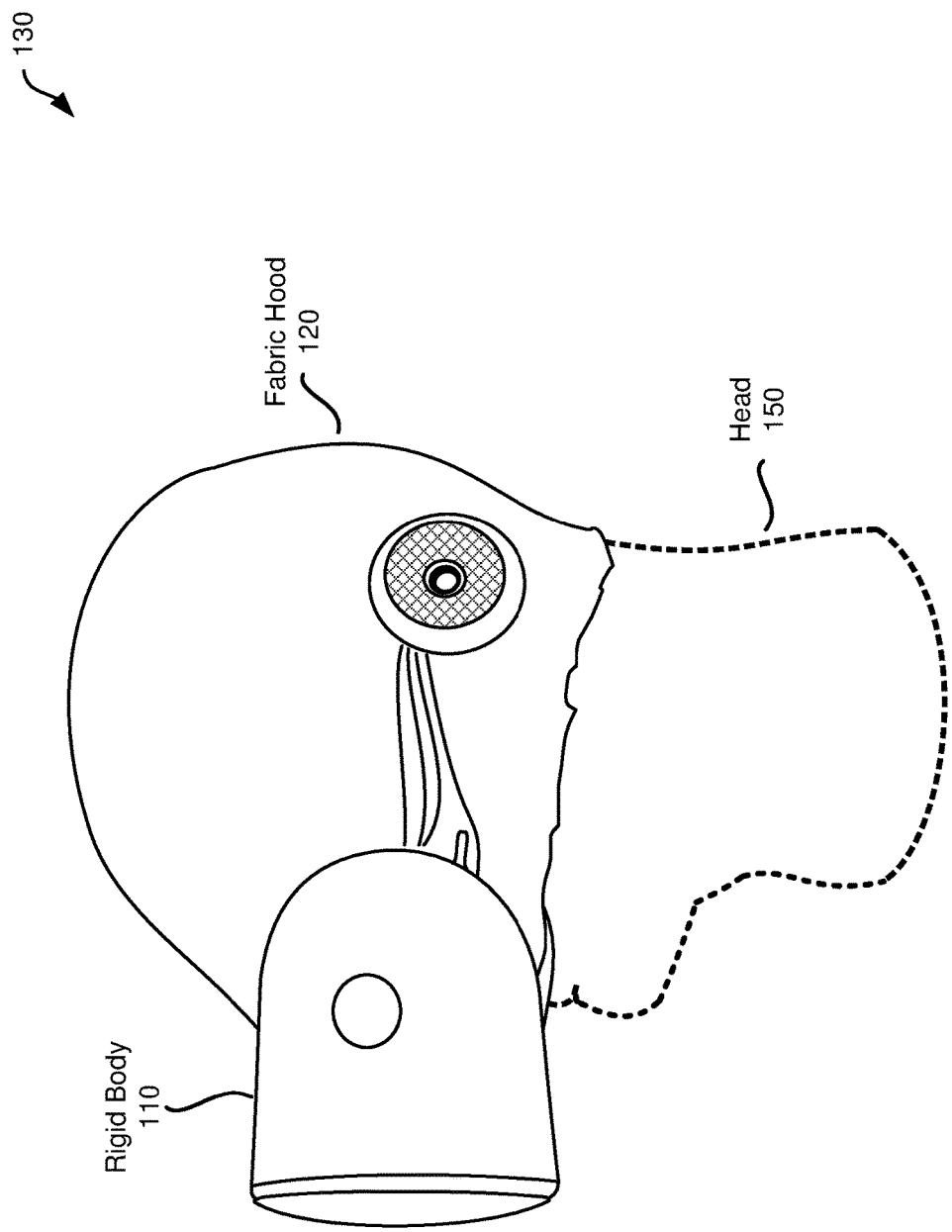
FIG. 5 illustrates a side e view of the HMD of FIG. 1, according to an embodiment.

FIG. 5 illustrates a side view of the HMD 130 of FIG. 1, according to an embodiment. As shown in FIG. 5, the edge of the fabric hood 120 extends below the level of the ear of the user's head 150. The fabric hood 120 is attached to the rigid body 110 along the border of the open face of the rigid body 110, and further surrounds the user's head 150 as shown. At the back of the user's head, the fabric hood 120 may extend beyond (or below) the level of the fabric hood 120 at the front of the user's head.

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:
1. A head-mounted display (HMD) comprising:
    a fabric hood shaped and dimensioned to be worn over a user's head, the fabric hood comprising a light-blocking fabric;
    a rigid body housing a display panel at one side and open at an opposite side to interface with the user's face; and
    a fixture configured to secure the fabric hood to the rigid body along an entire border of the opposite side of the rigid body, wherein the fixture securing the fabric hood to the rigid body prevents ambient light from entering the rigid body.
2. The head-mounted display (HMD) of claim 1, wherein a lower edge of the fabric hood extends to a portion of the user's head that is below an ear of the user.
3. The head-mounted display (HMD) of claim 1, wherein at least one speaker is attached to the fabric hood at a position corresponding to an ear of the user when the fabric hood is worn over the user's head.
4. The head-mounted display (HMD) of claim 1, wherein the fabric hood is collapsible.
5. The head-mounted display (HMD) of claim 1, wherein the fabric hood is made of an elastic material.
6. The head-mounted display (HMD) of claim 1, wherein the fabric hood distributes a weight of the rigid body across portions of the fabric hood that come in contact with the user's head.

7. The head-mounted display (HMD) of claim 1, wherein a lower edge of the fabric hood incorporates an elastic band, the elastic band attached to the fabric hood.

8. The head-mounted display (HMD) of claim 1, wherein the fabric hood is removably secured to the rigid body by the fixture.

9. The head-mounted display (HMD) of claim 1, wherein the fabric hood blocks light from entering through a gap between the rigid body and the user's head.

\* \* \* \* \*